(12) United States Patent
Shah et al.

(10) Patent No.: US 10,598,006 B2
(45) Date of Patent: Mar. 24, 2020

(54) METHODS AND SYSTEMS FOR DOWNHOLE SENSING AND COMMUNICATIONS IN WELLS

(71) Applicant: General Electric Company, Schenectady, NY (US)

(72) Inventors: Vimal Vinod Shah, Sugar Land, TX (US); Victor Jose Acacio, Houston, TX (US); Walter Chapman, Kingwood, TX (US); Jewell Cope, Oklahoma City, OK (US); Jinfeng Zhang, Edmond, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 239 days.

(21) Appl. No.: 15/608,647

(22) Filed: May 30, 2017

(65) Prior Publication Data

US 2018/0347343 A1   Dec. 6, 2018

(51) Int. Cl.
   *G01V 3/00*   (2006.01)
   *E21B 47/12*   (2012.01)
   (Continued)

(52) U.S. Cl.
   CPC .......... *E21B 47/122* (2013.01); *E21B 17/003* (2013.01); *E21B 43/122* (2013.01); *E21B 47/1005* (2013.01); *H04B 13/00* (2013.01)

(58) Field of Classification Search
   CPC .......... E21B 47/00; E21B 47/06; E21B 47/12; E21B 47/122; E21B 29/02; H04B 13/02; G01V 3/00
   See application file for complete search history.

(56) References Cited

U.S. PATENT DOCUMENTS

| | | |
|---|---|---|
| 4,505,155 A | 3/1985 | Jackson |
| 4,510,551 A | 4/1985 | Brainard, II |
| | (Continued) | |

FOREIGN PATENT DOCUMENTS

| | | |
|---|---|---|
| CN | 2451735 Y | 10/2001 |
| CN | 203130075 U | 8/2013 |
| | (Continued) | |

OTHER PUBLICATIONS

Almanza et al., "Capillary Tube Technology in Downhole Pressure Acquisition and Their Application in Brazil Petrobras Northern Asset Campos Basin", IADC/SPE Drilling Conference, Orlando, Florida, USA, Mar. 4-6, 2008.

(Continued)

*Primary Examiner* — Neel D Shah
(74) *Attorney, Agent, or Firm* — Armstrong Teasdale LLP

(57) ABSTRACT

A production well includes a casing and encapsulated tubing positioned within the casing. The encapsulated tubing includes a conductive sidewall defining a channel for an injection fluid. The production well further includes an insulative layer surrounding the conductive sidewall. The production well also includes a controller configured to regulate flow of an electrical current through the conductive sidewall. The production well further includes production tubing positioned within the casing and configured to channel a production fluid through the casing. The insulative layer is configured to inhibit transmission of the electrical current between the conductive sidewall and the production tubing. The production well also includes at least one sensor positioned within the casing to detect downhole conditions of the production well. The conductive sidewall is configured to conduct electrical current toward the at least one sensor.

19 Claims, 6 Drawing Sheets

(51) Int. Cl.
*E21B 17/00* (2006.01)
*E21B 47/10* (2012.01)
*E21B 43/12* (2006.01)
*H04B 13/00* (2006.01)

(56) References Cited

U.S. PATENT DOCUMENTS

| | | | |
|---|---|---|---|
| 5,419,188 A | 5/1995 | Rademaker et al. | |
| 5,467,083 A | 11/1995 | McDonald et al. | |
| 5,969,242 A * | 10/1999 | Hubbell | E21B 47/06 166/250.03 |
| 6,766,141 B1 | 7/2004 | Briles et al. | |
| 6,957,577 B1 | 10/2005 | Firmin | |
| 7,230,542 B2 | 6/2007 | Smits et al. | |
| 7,750,808 B2 | 7/2010 | Masino et al. | |
| 9,260,961 B2 | 2/2016 | Miller et al. | |
| 2002/0036085 A1 * | 3/2002 | Bass | E21B 17/003 166/250.01 |
| 2002/0126021 A1 * | 9/2002 | Vinegar | E21B 43/122 340/854.3 |
| 2003/0058127 A1 | 3/2003 | Babour et al. | |
| 2005/0145416 A1 | 7/2005 | Reed et al. | |
| 2006/0124318 A1 * | 6/2006 | Sheffield | E21B 17/023 166/381 |
| 2007/0257812 A1 * | 11/2007 | Lasater | E21B 47/12 340/854.8 |
| 2008/0236836 A1 * | 10/2008 | Weng | E21B 43/26 166/366 |
| 2010/0052941 A1 * | 3/2010 | Madhavan | E21B 4/02 340/854.8 |
| 2011/0191028 A1 | 8/2011 | Ross et al. | |
| 2013/0277047 A1 | 10/2013 | Kuhn De Chizelle et al. | |
| 2015/0377016 A1 | 12/2015 | Ahmad | |
| 2016/0356151 A1 | 12/2016 | Godager et al. | |
| 2018/0073310 A1 * | 3/2018 | Varkey | E21B 47/123 |

FOREIGN PATENT DOCUMENTS

| | | |
|---|---|---|
| GB | 2093501 B | 1/1985 |
| WO | 2009088501 A1 | 7/2009 |
| WO | 2014/107470 A2 | 7/2014 |

OTHER PUBLICATIONS

Xuanchao et al., "Notice of Retraction Research on Downhole Wireless Remote Monitoring and Information Transmission Technology", Education Technology and Computer Science (ETCS), 2010 Second International Workshop on, Wuhan, pp. 756-759, Mar. 6-7, 2010.

International Search Report and Written Opinion issued in connection with corresponding PCT Application No. PCT/US2018/031698 dated Aug. 14, 2018.

* cited by examiner

METHODS AND SYSTEMS FOR DOWNHOLE SENSING AND COMMUNICATIONS IN WELLS

BACKGROUND

The field of the invention relates generally to production wells, and more specifically, to methods and systems for downhole sensing and communications in a production well.

In at least some known production wells, downhole sensing equipment (e.g., temperature and pressure sensors) are used below the surface to monitor conditions below the surface. At least some known production wells use one or more cables that extend from the surface through the production well to the downhole sensing equipment. The cables supply power to the downhole sensing equipment and/or provide communication between the downhole sensing equipment and the surface. However, at least some known cables increase the cost to assemble the production well and reduce the space available for other components in the production well (e.g., pipes, conduits, mandrels, etc.). Accordingly, it is desirable to wirelessly provide power and communications between surface equipment and downhole sensing equipment in a production well.

BRIEF DESCRIPTION

In one aspect, a production well is provided. The production well includes a casing and encapsulated tubing positioned within the casing. The encapsulated tubing is configured to channel an injection fluid through the casing. The encapsulated tubing includes a conductive sidewall defining a channel for the injection fluid. The production well further includes an insulative layer surrounding the conductive sidewall. The production well also includes a controller configured to regulate flow of an electrical current through the conductive sidewall. The production well further includes production tubing positioned within the casing and configured to channel a production fluid through the casing. The insulative layer is configured to inhibit transmission of the electrical current between the conductive sidewall and the production tubing. The production well also includes at least one sensor positioned within the casing to detect downhole conditions of the production well. The conductive sidewall is configured to conduct electrical current toward the at least one sensor.

In another aspect, a method of sensing downhole conditions in a production well is provided. The method includes channeling an injection fluid through encapsulated tubing positioned within a casing of the production well. The encapsulated tubing includes a conductive sidewall. The method also includes regulating, using a controller, flow of electrical current through the conductive sidewall. The insulative layer surrounds the conductive sidewall and is configured to inhibit the electrical current from discharging to conductive components within the casing. The method further includes directing a production fluid through production tubing positioned within the casing. The insulative layer is configured to inhibit transmission of the electrical current between the conductive sidewall and the production tubing. The method also includes detecting a condition within the casing using at least one sensor positioned with the casing. The conductive sidewall is configured to conduct electrical current toward the at least one sensor. The method also includes sending a signal relating to the condition within the casing from the at least one sensor to the controller.

DRAWINGS

These and other features, aspects, and advantages of the present disclosure will become better understood when the following detailed description is read with reference to the accompanying drawings in which like characters represent like parts throughout the drawings, wherein.

Figure 1:
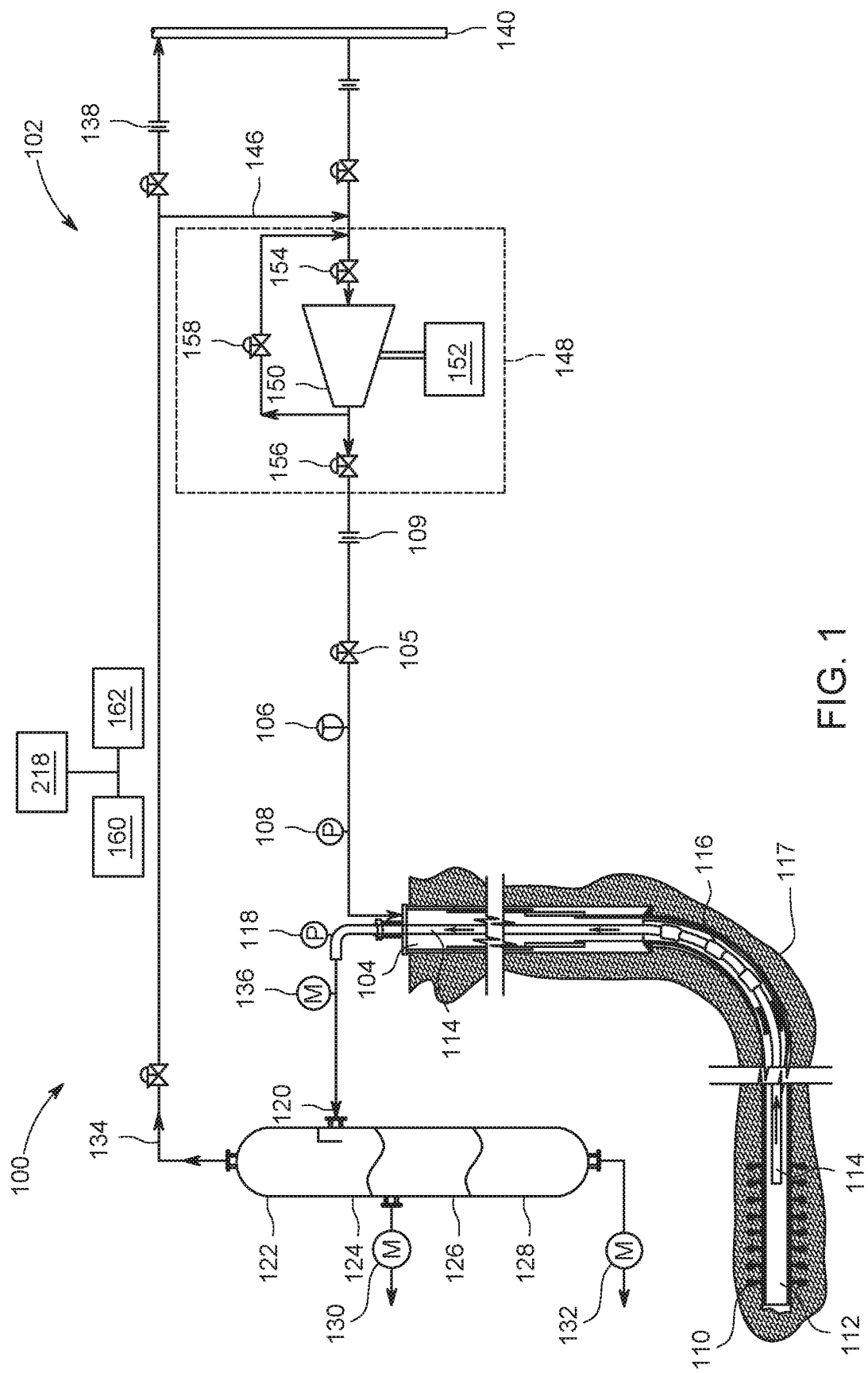
FIG. 1 is a schematic diagram of an exemplary production system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), a programmable logic unit (PLU), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein provide power and communications for downhole sensing equipment. These methods and systems use tubing to transmit power to downhole sensing equipment, and provide wireless communication between surface equipment and the downhole sensing equipment. For example, in some embodiments, encapsulated tubing provides a current flow path between the surface equipment and the downhole sensing equipment. In addition, in some embodiments, production tubing acts a ground to provide a return path for the electrical current. The electrical current provides power to the downhole sensing equipment and enables the transmission of signals between the surface equipment and the downhole sensing equipment. Accordingly, the systems and methods provide wireless power and communications between downhole components and the surface, and eliminate the need to run power and communication cables down through a well.

FIG. 1 is a schematic diagram of an exemplary production system 100. Production system 100 includes an artificial lift system 102 and a well 104. In the exemplary embodiment, well 104 is a hole drilled for extracting production fluid 110, such as crude oil, water, and/or gas, from the ground. Artificial lift system 102 is configured to facilitate extracting fluid through well 104. For example, in some embodiments, a fluid such as gas is injected into well 104 and proceeds downhole. Artificial lift system 102 includes an injection control valve 105 which regulates a quantity of fluid injected into well 104. While the fluid is being injected, an injection temperature sensor 106, an injection pressure sensor 108, and an injection meter 109 take measurements at the surface. The injected fluid induces a reduction in the density of one or more fluids 110 in well 104, so that reservoir pressure 112 is sufficient to push fluids 110 up a tubing 114. In the exemplary embodiment, one or more lift valves 116 assist the flow of fluids 110 up tubing 114. In some embodiments, downhole temperature and pressure sensors 117 take measurements at downhole locations. In alternative embodiments, artificial lift system 102 has any configuration that enables production system 100 to operate as described herein. For example, in some embodiments, artificial lift system 102 is configured to inject any fluid including, without limitation, chemicals, gas, liquids, and/or fuel. In further embodiments, artificial lift system 102 is omitted.

In the exemplary embodiment, at the top of well 104, a flow tube pressure sensor 118 measures the wellhead tubing pressure. A flow line 120 channels fluids 110 to a separator 122. Separator 122 separates fluid 110 into gas 124, oil 126, and water 128. Oil 126 is removed by separator 122 and the amount of oil retrieved is metered by oil meter 130. Water 128 is also removed by separator 122 and the amount of water retrieved is metered by water meter 132. Gas 124 is siphoned out of separator 122 through gas line 134. In some embodiments, multi-phase flow meter 136 replaces oil meter 130 and water meter 132. In these embodiments, a multi-phase flow meter 136 is used to measure production. Some gas 124 is transferred to a gas pipeline 140 through a gas production meter 138. In the exemplary embodiment, some gas 124 is transferred to a compressor 148 though a flow line 146.

Gas 124 enters compressor 148 through compressor suction valve 154. In the exemplary embodiment, compressor 148 includes a compressor engine 150. Compressor 148 compresses gas 124, and a compressor controller 152 regulates the speed of compressor engine 150. In some embodiments, compressor 148 is driven by gas or electricity. In further embodiments, the speed of compressor engine 150 is measured in regulating the revolutions per minute (RPM) of compressor engine 150. A compressor back pressure valve 156 ensures sufficient discharge pressure for the well and recycles excessive gas back to the compressor suction valve 154. A compressor recycle valve 158 is an overflow valve that reintroduces gas 124 above a certain pressure back into compressor 148 through compressor suction valve 154. Gas 124 flows from compressor 148 to well 104. The amount of gas that is injected into well 104 is measured by injection meter 109.

During normal operation of production system 100, gas 124 is compressed by compressor 148. The amount of gas 124 injected into well 104 is controlled by injection control valve 105 and measured by injection meter 109. In well 104, gas 124 mixes with fluids 110. The mixture of fluids 110 and gas 124 is pushed up through tubing 114 to the top of well 104 by reservoir pressure 112. The mixture of gas 124 and fluids 110 travels through flow line 120 into separator 122, where fluids 110 and gas 124 are separated. A quantity of gas 124 is routed back to compressor 148 to be reinjected into well 104. Excess gas 124 is routed to gas pipeline 140 to be sold or otherwise used elsewhere. In some embodiments, some gas 124 is used to power compressor engine 150.

In the exemplary embodiment, production system 100 includes a controller 160 installed at the surface of production system 100. Controller 160 receives signals from one or more downhole communication or telemetry systems located in well 104, as described herein. Controller 160 processes the received signals (e.g., by decrypting or converting the information therein) and generates one or more outputs based on the processed signals. The outputs may, for example, cause information to be displayed on a display device 162 communicatively coupled to controller 160 for viewing by a human operator.

Also, in the exemplary embodiment, a power supply 164 is coupled to controller 160. In addition, as described herein, power supply 164 is wirelessly coupled to sensors 117. Power supply 164 provides electrical current to controller 160, sensors 117, and/or other components of production system 100. For example, in some embodiments, power supply 164 provides direct current and/or alternating current. In further embodiments, power supply 164 provides 110 Volt, 220 Volt, and 440 Volt alternating current. In alternative embodiments, power supply 164 provides any power that enables well 200 to operate as described herein.

Figure 2:
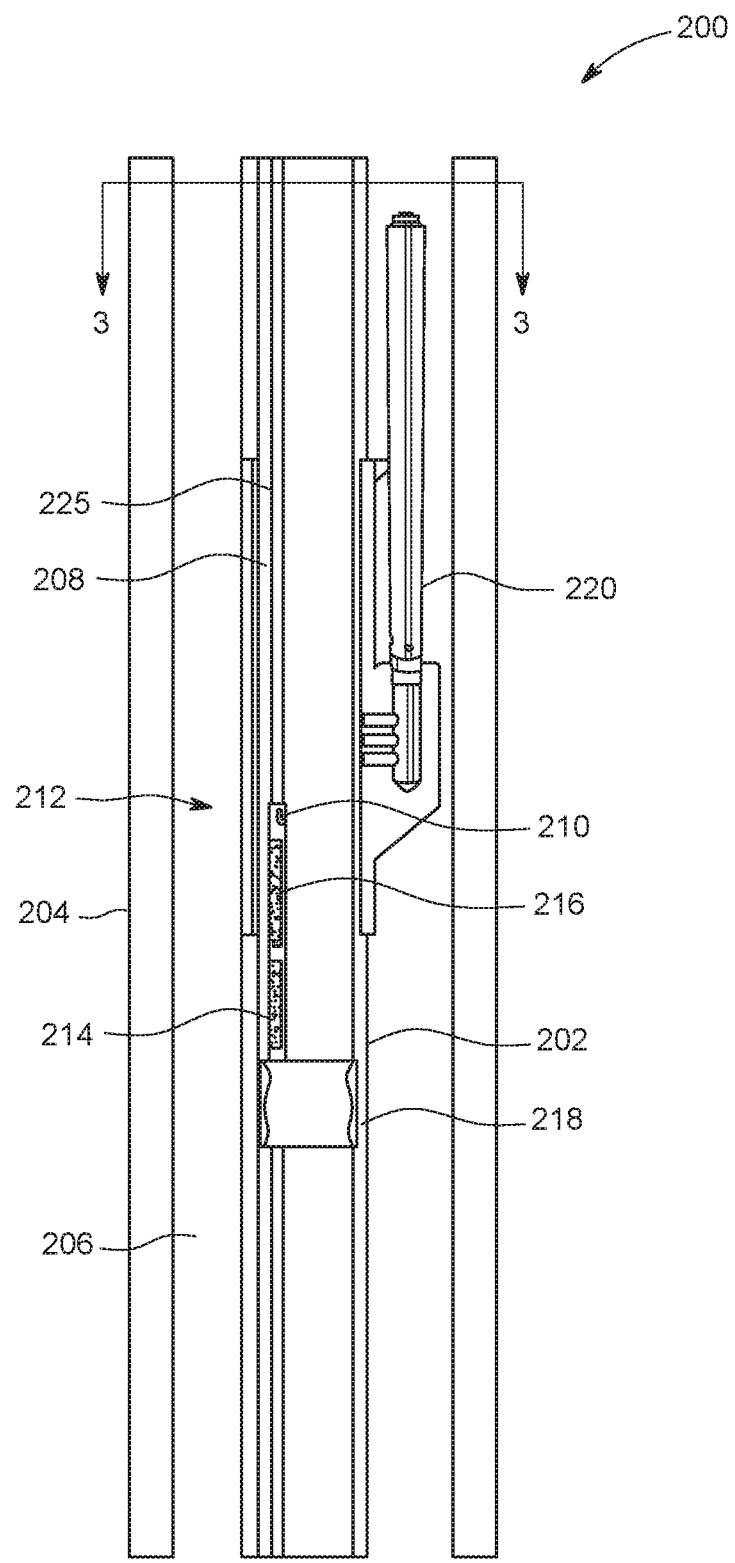
FIG. 2 is a schematic diagram of a portion of an exemplary production well for use with the system shown in FIG. 1.
Figure 3:
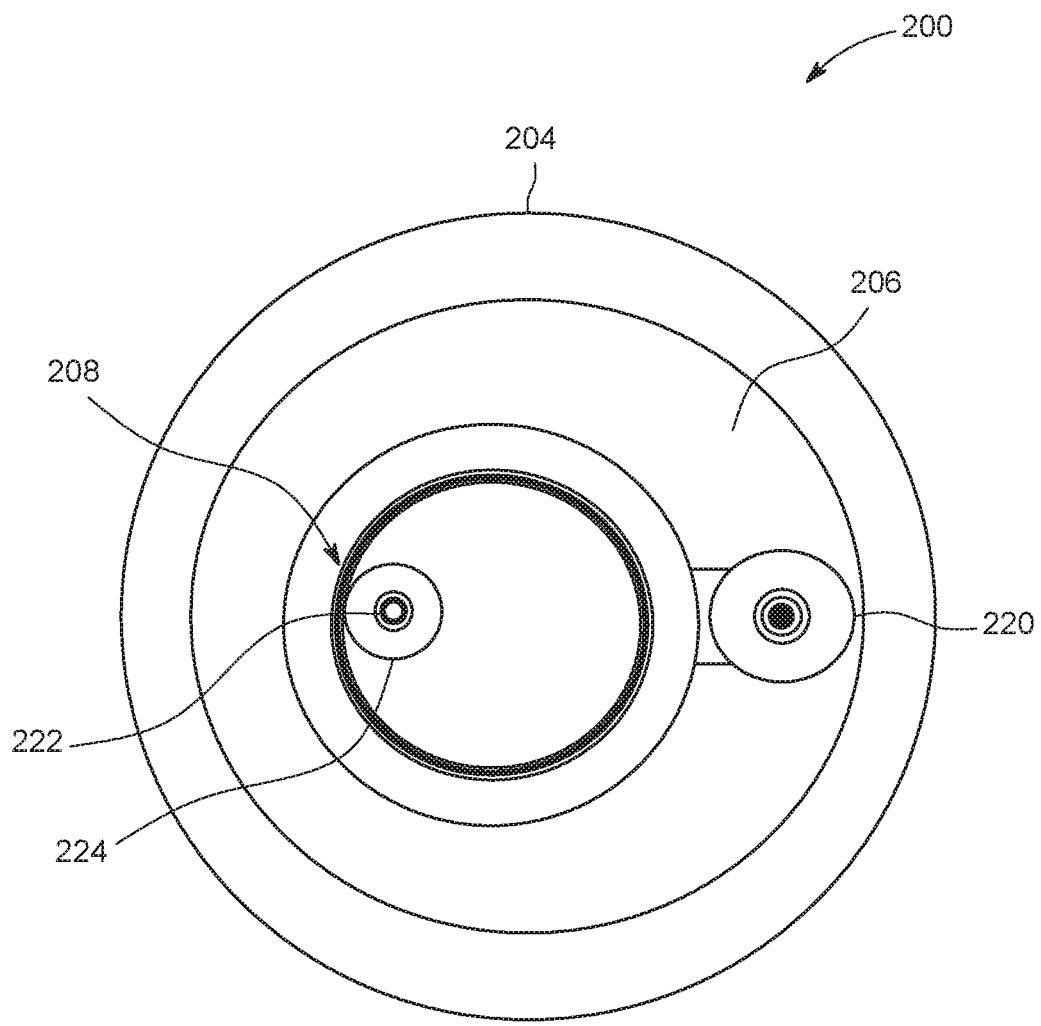
FIG. 3 is a cross-section of the production well shown in FIG. 2 taken along section line 3-3.

FIG. 2 is a schematic diagram of a portion of an exemplary well 200, such as well 104 (shown in FIG. 1). FIG. 3 is a cross-section of well 200 taken along section line 3-3. Well 200 includes production tubing 202, such as tubing 114 (shown in FIG. 1), that extends through a casing 204. An annulus 206 is defined between production tubing 202 and casing 204. In addition, well 200 includes encapsulated tubing 208 located within production tubing 202. In alternative embodiments, encapsulated tubing 208 is located within annulus 206 between production tubing 202 and casing 204.

In the exemplary embodiment, production tubing 202 and encapsulated tubing 208 are configured to channel fluids. Production tubing 202 has a first diameter and is configured to channel fluids 110 (shown in FIG. 1) upwards through casing 204 towards a wellhead. Encapsulated tubing 208 has a second diameter less than the first diameter and is configured to channel fluids downhole in well 104. Encapsulated tubing 208 includes a discharge port 210 configured to discharge the fluids. For example, in some embodiments, artificial lift system 102 (shown in FIG. 1) is configured to direct injection fluids through a capillary string including encapsulated tubing 208 and encapsulated tubing 208 discharges the injection fluids downhole into well 200. In alternative embodiments, well 200 includes any tubing that enables well 200 to operate as described herein. For example, in some embodiments, encapsulated tubing 208 is configured to channel fluids 110 (shown in FIG. 1) towards the wellhead.

Also, in the exemplary embodiment, well 200 includes a downhole tool 212. Downhole tool 212 includes at least one sensor 214 and a communications device 216. Downhole tool 212 is coupled to an end of encapsulated tubing 208 and is positioned in casing 204. In some embodiments, casing 204 includes positioning features such as a landing nipple and landing tool 218 to locate downhole tool 212. Communications device 216 is configured to communicate with controller 160 (shown in FIG. 1). In alternative embodiments, well 200 includes any downhole tool that enables well 200 to operate as described herein.

Moreover, in the exemplary embodiment, sensor 214 is configured to detect downhole conditions within casing 204. For example, in some embodiments, sensor 214 includes, without limitation, pressure sensors, temperature sensors, position determination sensors (e.g., ultrasonic sensors), accelerometers, flow sensors (e.g., acoustic flow sensors), fluid property sensors, conductivity sensors, salinity sensors, microwave water-cut sensors, vortex flow sensors, nuclear densometers, etc. In alternative embodiments, well 200 includes any sensor 214 that enables well 200 to operate as described herein. For example, in some embodiments, sensor 214 includes a pressure sensor in communication with a pressure port to facilitate measuring, for example, a pressure within a gas lift mandrel 220 and/or production tubing 202.

Also, in the exemplary embodiment, encapsulated tubing 208 includes a conductive sidewall 222 and an insulative layer 224. Conductive sidewall 222 is cylindrical and defines a channel 225 for injection fluid. Conductive sidewall 222 includes a conductive material and is configured to conduct electrical current to sensors 214. For example, in some embodiments, conductive sidewall 222 is constructed of a metal such as stainless steel and/or Inconel. Accordingly, encapsulated tubing 208 acts as a mono-conductor. In alternative embodiments, encapsulated tubing 208 includes any conductive sidewall 222 that enables well 200 to operate as described herein.

In addition, in the exemplary embodiment, production tubing 202 includes a conductive material. For example, in some embodiments, production tubing 202 is constructed of metals such as steel. Accordingly, production tubing 202 acts as ground tubing and is configured to conduct electrical current from sensors 214 towards the wellhead.

Moreover, in the exemplary embodiment, insulative layer 224 surrounds conductive sidewall 222 and is configured to inhibit electrical current from discharging to conductive components within casing 204 during operation of well 200 when electrical current is flowing through conductive sidewall 222 and/or production tubing 202. In the exemplary embodiments, insulative layer 224 is constructed of nonconductive or electrically insulative materials such as plastics (e.g., nylon and polytetrafluoroethylene (PTFE). In some embodiments, insulative layer 224 is a coating on conductive sidewall 222. In alternative embodiments, encapsulated tubing 208 includes any insulative layer 224 that enables encapsulated tubing 208 to function as described herein.

Also, in the exemplary embodiment, a portion of conductive sidewall 222 extends beyond insulative layer 224 and couples to downhole tool 212. Specifically, an end of conductive sidewall 222 extends beyond insulative layer 224 and is in contact with power electronics and/or communication device 216 of downhole tool 212. In alternative embodiments, encapsulated tubing 208 and sensor 214 are coupled in any manner that enables well 200 to operate as described herein.

Figure 4:
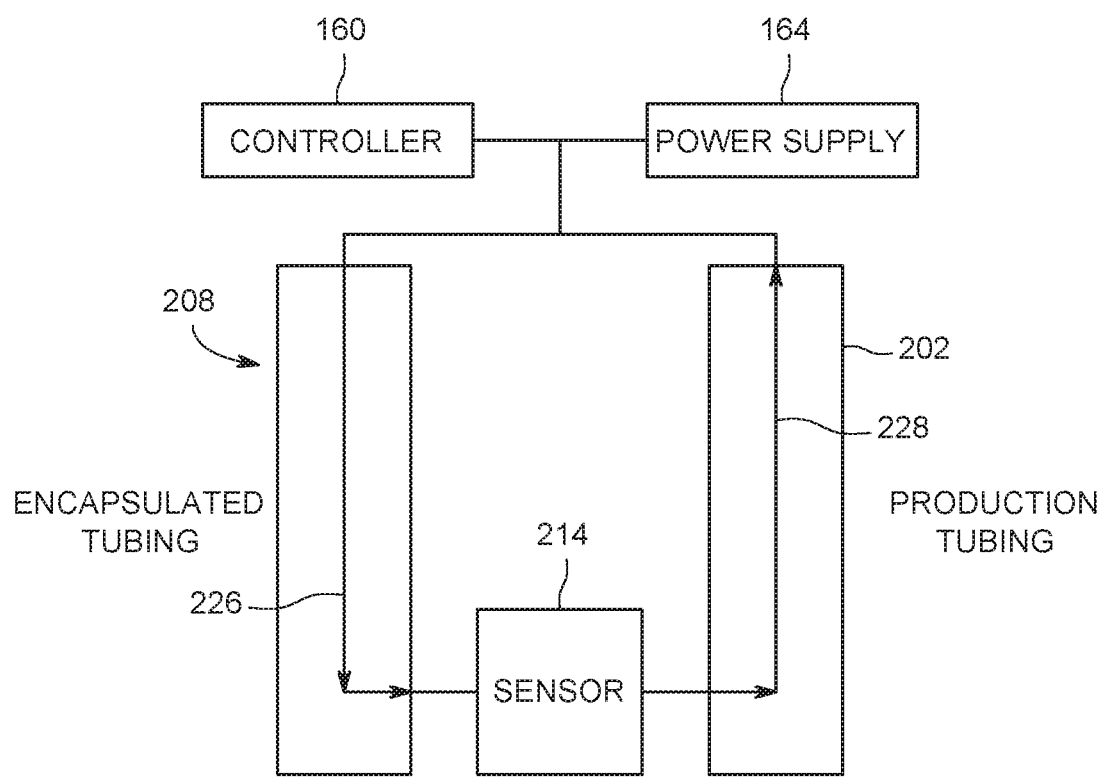
FIG. 4 is a schematic diagram of current flow in the production well shown in FIG. 2.

FIG. 4 is a schematic diagram of current flow in the production well 200. Encapsulated tubing 208 and production tubing 202 define a current flow path 226 between sensor 214 and power supply 164. In particular, encapsulated tubing 208 is coupled to power supply 164 and sensor 214 and conveys electrical power from power supply 164 to sensor 214. Sensor 214 is configured to operate using the electrical power received from power supply 164. Production tubing 202 acts as ground tubing to provide a return path 228 for the electrical current. In addition, encapsulated tubing 208 and production tubing 202 transfer signals between sensor 214 and controller 160. Accordingly, encapsulated tubing 208 and production tubing 202 eliminate the need for one or more cables in well 200 to provide power to downhole equipment, and to provide communications between downhole equipment and the surface.

Also, in the exemplary embodiment, controller 160 is configured to regulate flow of an electrical current through conductive sidewall 222. Accordingly, controller 160 regulates the power supplied to sensors 214. In addition, controller 160 (shown in FIG. 1) regulates the electrical current to communicate using encapsulated tubing 208. For example, in some embodiments, controller 160 (shown in FIG. 1) is configured to send signals through encapsulated tubing 208 to sensor 214. In addition, controller 160 is configured to monitor the electric current transferred through encapsulated tubing 208 and/or production tubing 202 and receive signals sent through encapsulated tubing 208 and/or production tubing 202 from sensor 214 and/or other components of well 200.

Figure 5:
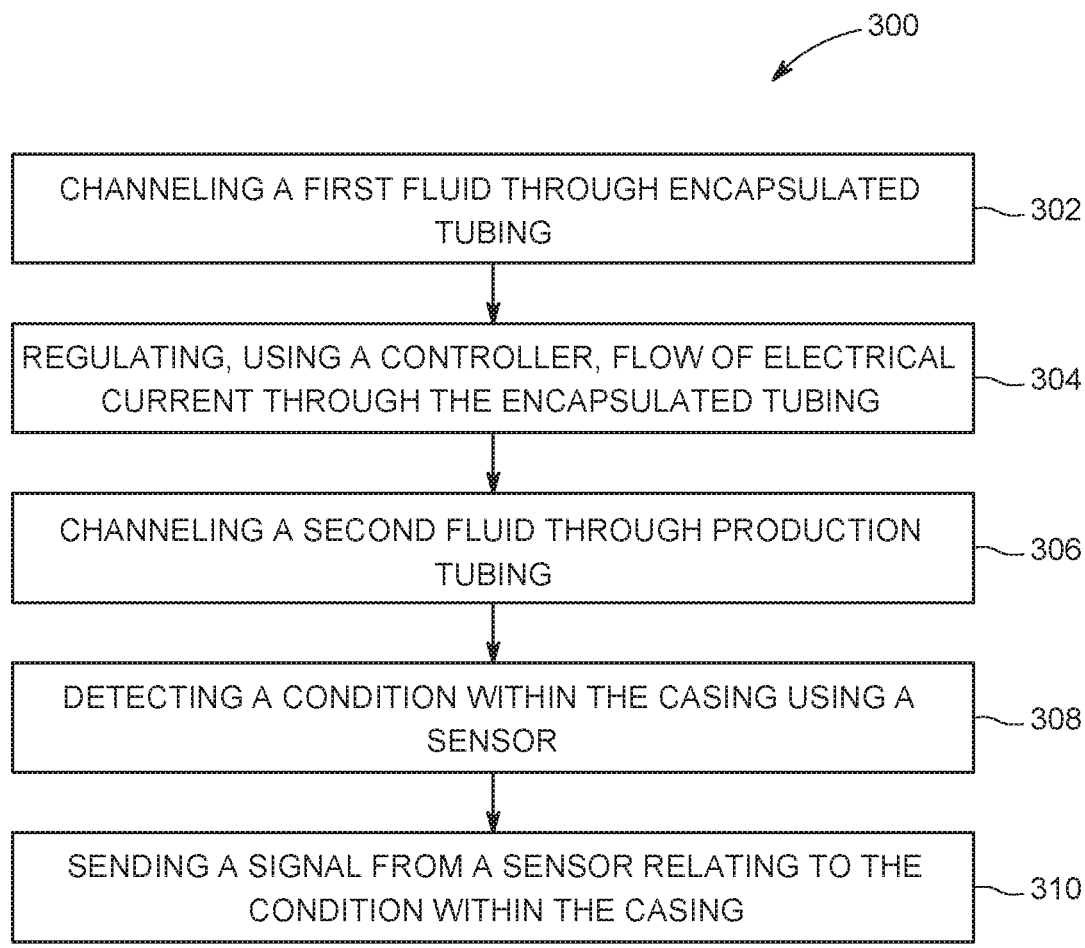
FIG. 5 is a flow diagram of an exemplary method for sensing downhole conditions of the production well shown in FIG. 2.

FIG. 5 is a flow diagram of an exemplary method 300 of sensing downhole conditions of production well 200. In reference to FIGS. 4 and 5, method 300 generally includes channeling 302 an injection fluid through encapsulated tubing 208, regulating 304 flow of electrical current through conductive sidewall 222, channeling 306 a production fluid through production tubing 202, detecting 308 a condition within casing 204 using sensor 214, and sending 310 a signal relating to the condition.

In the exemplary embodiment, channeling 302 includes channeling the injection fluid from the wellhead downhole through encapsulated tubing 208. In some embodiments, the injection fluid is used to facilitate operation of well 200. For example, in some embodiments, injection fluid is directed from a capillary string including encapsulated tubing 208. The injection fluid is directed along casing 204 to remediate deposition on casing 204, reduce the formation of scale on casing 204, and/or remove material or bridging extending across casing 204. In alternative embodiments, encapsulated tubing 208 is used to channel any fluid that enables well 200 to operate as described herein. For example, in some embodiments, artificial lift system 102 (shown in FIG. 1) directs fluid downhole through encapsulated tubing 208 to increase pressure in well 200 and facilitate production of well 200.

Also, in the exemplary embodiment, encapsulated tubing 208 is located anywhere within casing 204 (shown in FIG. 3) that enables well 200 to operate as described herein. For example, in some embodiments, channeling 302 includes channeling the injection fluid through encapsulated tubing 208 located on an exterior of production tubing 202. In further embodiments, channeling 302 includes channeling the injection fluid through encapsulated tubing 208 located within production tubing 202.

In addition, in the exemplary embodiment, channeling 306 includes channeling production fluid such as crude oil and/or gas through production tubing 202 towards a wellhead of production well 200. In alternative embodiments, production tubing 202 is used to channel any fluid that enables well 200 to operate as described herein.

Moreover, in the exemplary embodiment, signals are sent through encapsulated tubing 208 and/or production tubing 202 between sensor 214 and controller 160. Controller 160 is configured to determine conditions of well 200 based on the signals. For example, in some embodiments, controller 160 determines pressure and temperature. Controller 160 is configured to regulate components of well 200 based on the determined conditions to control operating conditions of well 200. In further embodiments, controller 160 sends signals through encapsulated tubing 208 and/or production tubing 202 toward sensor 214 to control sensor 214. In alternative embodiments, controller 160 and/or sensor 214 send any signals that enable well 200 to operate as described herein.

In addition, in the exemplary embodiment, sensor 214 is operated using the electrical current flowing through encapsulated tubing 208 and/or production tubing 202. In some embodiments, power is supplied continuously to sensor 214 during operation of sensor 214 from power supply 164. In further embodiments, the current from power supply 164 is used to charge a power source of sensor 214. In alternative embodiments, sensor 214 is powered in any manner that enables well 200 to operate as described herein.

Figure 6:
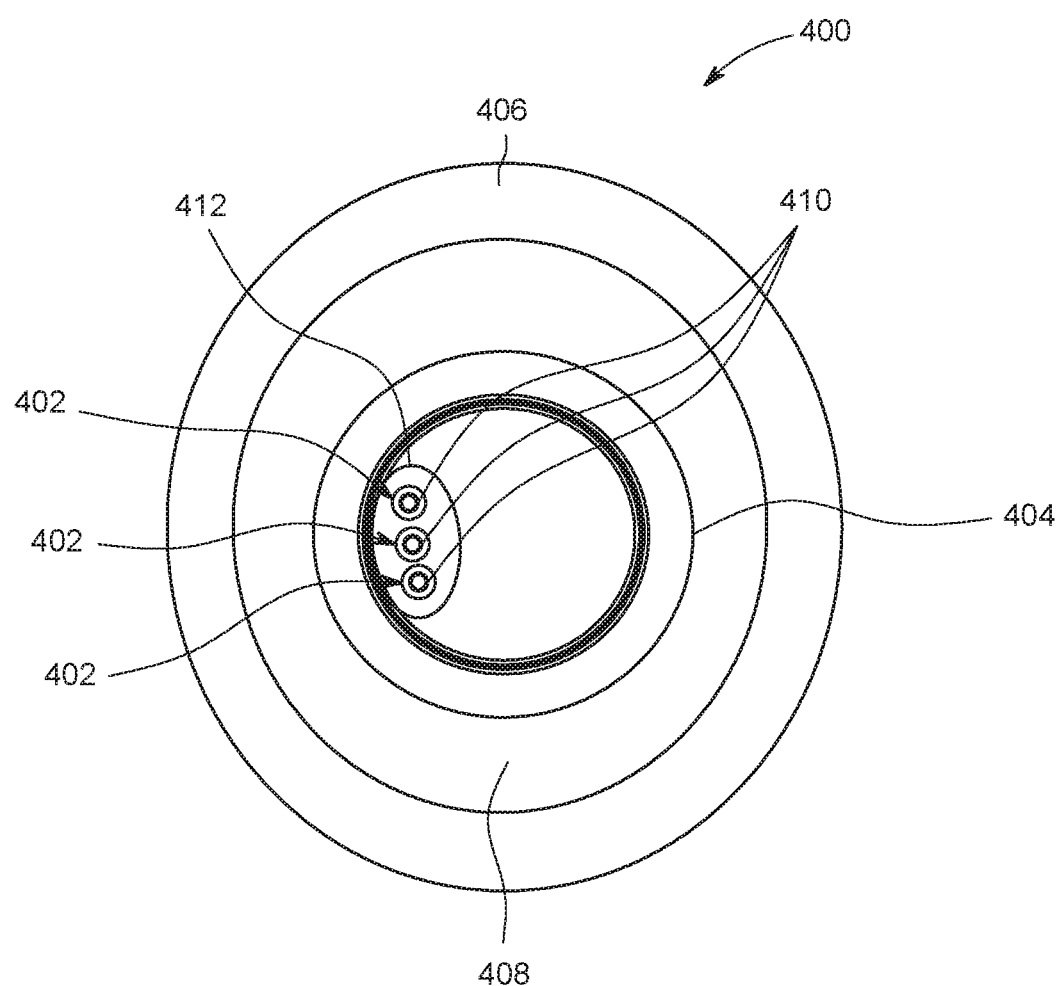
FIG. 6 is a cross-section of an exemplary embodiment of a production well including a plurality of encapsulated tubing.

FIG. 6 is a cross-section of an exemplary embodiment of a production well 400 including a plurality of encapsulated tubing 402. Production well 400 includes production tubing 404, such as tubing 114 (shown in FIG. 1), that extends through a casing 406. An annulus 408 is defined between production tubing 404 and casing 406. In addition, production well 400 includes a plurality of encapsulated tubing 402 located within production tubing 202. In alternative embodiments, encapsulated tubing 402 is located within annulus 408 between production tubing 404 and casing 406.

Also, in the exemplary embodiment, the plurality of encapsulated tubing 402 are coupled together to form a single pack. Each encapsulated tubing 402 includes a conductive sidewall 410. In the exemplary embodiment, conductive sidewall 410 includes conductive metals such as stainless steel and Inconel. An insulative layer 412 surrounds encapsulated tubing 402 and electrically isolates each conductive sidewall 410. Insulative layer 412 includes electrically insulative materials such as nylon or PTFE. In alternative embodiments, encapsulated tubing 402 includes any insulative layer 412 that enables encapsulated tubing 402 to function as described herein. For example, in some embodiments, each encapsulated tubing 402 includes a separate insulative layer 412.

In addition, in the exemplary embodiment, conductive sidewall 410 of at least one encapsulated tubing 402 is configured to act as a conductor to conduct current downhole and conductive sidewall 410 of at least one other encapsulated tubing 402 is configured to act as a return for the electrical current. In alternative embodiments, production well 400 includes any encapsulated tubing 402 that enables production well 400 to operate as described herein. For example, in some embodiments, production well 400 includes pluralities of encapsulated tubing 402 coupled in separate packs. In further embodiments, some encapsulated tubing 402 does not necessarily include conductive sidewall 410.

The above-described systems and methods provide power and communications for downhole sensing equipment. These methods and systems use tubing to transmit power to downhole sensing equipment, and provide wireless communication between surface equipment and the downhole sensing equipment. For example, in some embodiments, encapsulated tubing provides a current flow path between the surface equipment and the downhole sensing equipment. In addition, in some embodiments, production tubing acts a ground to provide a return path for the electrical current. The electrical current provides power to the downhole sensing equipment and enables the transmission of signals between the surface equipment and the downhole sensing equipment. Accordingly, the systems and methods provide wireless power and communications between downhole components and the surface, and eliminate the need to run power and communication cables down through a well.

An exemplary technical effect of the methods, systems, and apparatus described herein includes at least one of: (a) providing a wireless system for communicating data between downhole components and the surface; (b) utilizing tubing to provide power to downhole components; (c) eliminating obstructions and additional equipment in production wells; (d) provide downhole wireless communication and power system that is compatible with existing systems; and (e) increase real-time monitoring capabilities of downhole conditions.

Exemplary embodiments of method and systems for downhole sensing and communications in production wells are described above in detail. The method and systems described herein are not limited to the specific embodiments described herein, but rather, components of systems or steps of the methods may be utilized independently and separately from other components or steps described herein. For example, the methods may also be used in combination with multiple different production systems, and are not limited to practice with only the production systems as described herein. Additionally, the methods may also be used with other tubing, and are not limited to practice with only the tubing as described herein. Rather, the exemplary embodiments may be implemented and utilized in connection with many other production systems to be operated as described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A production well comprising:
    a casing;
    encapsulated tubing within said casing and configured to channel an injection fluid through said casing, said encapsulated tubing including a conductive sidewall defining a channel for the injection fluid;
    an insulative layer surrounding said conductive sidewall;
    a controller configured to regulate flow of an electrical current through said conductive sidewall;
    production tubing within said casing and configured to channel a production fluid through said casing, wherein said insulative layer is configured to inhibit transmission of the electrical current between said conductive sidewall and said production tubing, wherein said encapsulated tubing is within said production tubing; and
    at least one sensor positioned within said casing to detect downhole conditions of said production well, wherein said conductive sidewall is configured to conduct the electrical current toward said at least one sensor.

2. The production well in accordance with claim 1, wherein said production tubing is configured to channel the production fluid towards a wellhead of said production well and has a first diameter.

3. The production well in accordance with claim 2, wherein said encapsulated tubing is configured to channel the injection fluid away from the wellhead, wherein said encapsulated tubing has a second diameter less than the first diameter.

4. The production well in accordance with claim 1 wherein an artificial lift system is configured to direct the injection fluid through said encapsulated tubing.

5. The production well in accordance with claim 1, wherein said encapsulated tubing is configured to transmit signals between said controller and said at least one sensor.

6. The production well in accordance with claim 1, wherein said production tubing is configured to transmit signals between said at least one sensor and said controller.

7. The production well in accordance with claim 1 further comprising a power source coupled to said conductive sidewall, wherein said conductive sidewall is configured to convey electrical power between said power source and said at least one sensor, and wherein said at least one sensor is configured to operate using the electrical power.

8. The production well in accordance with claim 7, wherein said production tubing extends from said at least one sensor to a wellhead and is configured to provide a return path for the electrical current.

9. The production well in accordance with claim 1, wherein said encapsulated tubing is a first encapsulated tubing, said production well further comprising a second encapsulated tubing, wherein said second encapsulated tubing is configured to provide a return path for the electrical current.

10. The production well in accordance with claim 9, wherein said first encapsulated tubing and said second encapsulated tubing are coupled together in a pack, and wherein said insulative layer is configured to inhibit transmission of the electrical current between said first encapsulated tubing and said second encapsulated tubing.

11. The production well in accordance with claim 1, wherein said encapsulated tubing is a first encapsulated tubing and said insulative layer is a first insulative layer, said production well further comprising:
    a second encapsulated tubing positioned within said production tubing within said casing and configured to channel an injection fluid through said casing; and
    a second insulative layer surrounding said second encapsulated tubing.

12. A method of sensing downhole conditions in a production well, said method comprising:
- channeling an injection fluid through encapsulated tubing within production tubing within a casing of the production well, the encapsulated tubing including a conductive sidewall;
- regulating, using a controller, flow of electrical current through the conductive sidewall, wherein an insulative layer surrounds the conductive sidewall and is configured to inhibit the electrical current from discharging to conductive components within the casing;
- directing a production fluid through the production tubing, wherein the insulative layer is configured to inhibit transmission of the electrical current between the conductive sidewall and the production tubing;
- detecting a condition within the casing using at least one sensor positioned with the casing, wherein the conductive sidewall is configured to conduct the electrical current toward the at least one sensor; and
- sending a signal relating to the condition within the casing from the at least one sensor to the controller.

13. The method in accordance with claim 12, wherein directing a production fluid through production tubing positioned within the casing comprises directing the production fluid towards a wellhead of the production well, the production tubing having a first diameter.

14. The method in accordance with claim 13, wherein channeling an injection fluid through encapsulated tubing positioned within production tubing positioned within a casing of the production well comprises channeling the injection fluid from the wellhead, wherein the encapsulated tubing has a second diameter less than the first diameter.

15. The method in accordance with claim 12 further comprising directing the injection fluid through the encapsulated tubing using an artificial lift system.

16. The method in accordance with claim 12 further comprising transmitting, using the encapsulated tubing, signals between the controller and the at least one sensor.

17. The method in accordance with claim 12 further comprising transmitting, using the production tubing, signals between the controller and the at least one sensor.

18. The method in accordance with claim 12 further comprising operating the at least one sensor using electrical power conveyed through the conductive sidewall, wherein the conductive sidewall is coupled to a power source at a wellhead of the production well and wherein the conductive sidewall is configured to convey the electrical power between the power source and said at least one sensor.

19. The method in accordance with claim 18 further comprising directing the electrical current from the at least one sensor toward the power source through the production tubing.

\* \* \* \* \*